United States Patent [19]

Kazawa

[11] Patent Number: 5,424,882
[45] Date of Patent: Jun. 13, 1995

[54] SIGNAL PROCESSOR FOR DISCRIMINATING RECORDING DATA

[75] Inventor: Tohru Kazawa, Kokubunji, Japan

[73] Assignee: Hitachi, Ltd., Tokyo, Japan

[21] Appl. No.: 90,545

[22] Filed: Jul. 13, 1993

Related U.S. Application Data

[63] Continuation-in-part of Ser. No. 845,196, Mar. 3, 1992, Pat. No. 5,267,267, which is a continuation of Ser. No. 492,059, Mar. 12, 1990, Pat. No. 5,123,030.

[30] Foreign Application Priority Data

| Mar. 13, 1989 | [JP] | Japan | 1-057702 |
| Jun. 5, 1989 | [JP] | Japan | 1-141016 |
| Mar. 16, 1993 | [JP] | Japan | 5-055326 |

[51] Int. Cl.$^6$ ............................ G11B 5/09; G11B 27/10
[52] U.S. Cl. ............................................. 360/46; 360/51
[58] Field of Search ......................... 360/46, 51, 61; 375/108, 120

[56] References Cited

U.S. PATENT DOCUMENTS

| 3,978,284 | 8/1976 | Yoshino et al. | 178/69.5 |
| 4,351,061 | 9/1982 | Hedin et al. | 375/20 |
| 4,355,408 | 10/1982 | Scarrott | 375/110 |
| 4,367,495 | 1/1983 | Mita et al. | 360/39 |
| 4,386,323 | 5/1983 | Jansen | 328/63 |
| 4,584,690 | 4/1986 | Cafiero et al. | 375/18 |
| 4,775,984 | 10/1988 | Jaffre et al. | 375/17 |
| 4,775,989 | 10/1988 | Taketori et al. | 375/110 |
| 4,924,492 | 5/1990 | Gitlin et al. | 379/93 |
| 5,220,570 | 6/1993 | Lou et al. | 371/43 |
| 5,265,125 | 11/1993 | Ohta | 375/11 |

Primary Examiner—Aristotelis Psitos
Assistant Examiner—Won Tae C. Kim
Attorney, Agent, or Firm—Fay, Sharpe, Beall, Fagan, Minnich & McKee

[57] ABSTRACT

A signal processing circuit for discriminating recording data is formed by a detector circuit for detecting zero-cross points on an equalized waveform; a PLL for generating a clock at a rate twice the baud rate of a read signal by using the zero-cross timing as an input; a divider for dividing the output of the PLL to generate two baud rate clocks having different phases from each other; and a circuit for selecting one of the two clocks using the waveform of the read signal and for connecting the selected clock to discriminator and decoder circuits. The signal processing circuit also has a table for outputting therefrom a variable branch-metric value which is adaptively controlled using the output of an A/D convertor, internal data contained in the branch-metric table, or the output of the same.

4 Claims, 9 Drawing Sheets

SIGNAL PROCESSOR FOR DISCRIMINATING RECORDING DATA

CROSS-REFERENCE TO RELATED APPLICATION

This is a continuation-in-part of U.S. Ser. No. 07/845,196 filed Mar. 3, 1992, U.S. Pat. No. 5,267,267, which is a continuation of U.S. Ser. No. 492,059 filed Mar. 12, 1990 now U.S. Pat. No. 5,123,030 the contents of which are incorporated herein by reference.

BACKGROUND OF THE INVENTION

1. Field of the Invention

The present invention relates to a signal processor which can be applied to the reproduction of signals recorded by a magnetic recording apparatus, and more particularly, to an apparatus and method for reproducing signals from a head utilizing the magneto-resistance effect.

2. Description of the Related Art

Figure 2:
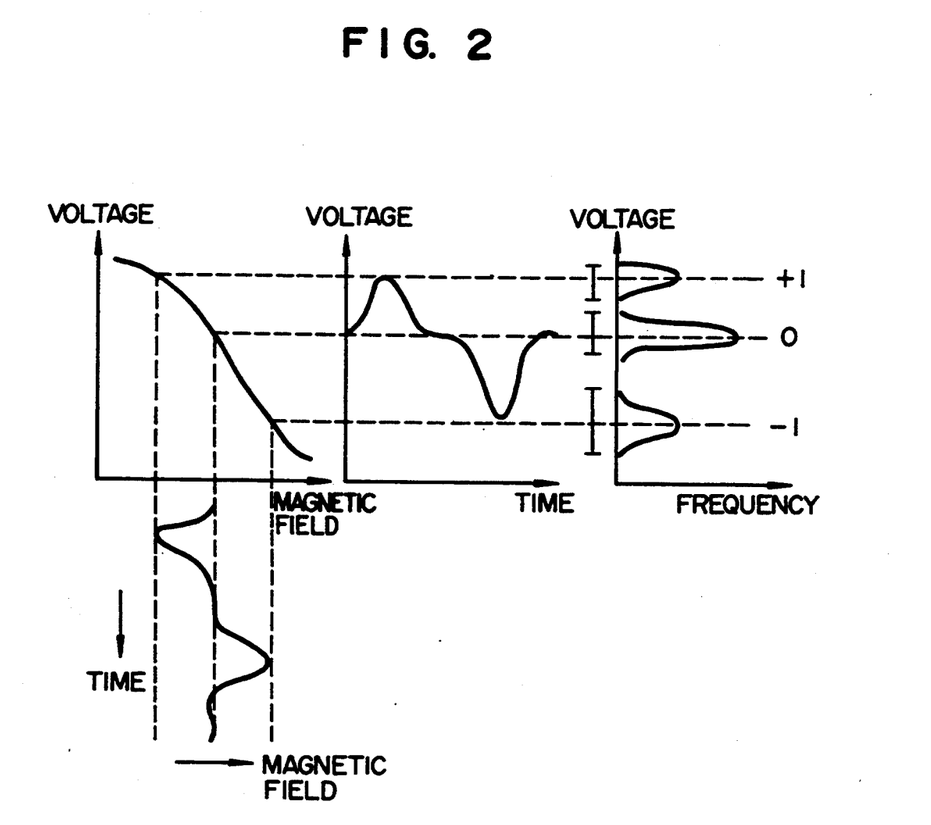
FIG. 2 shows graphs representing the characteristics of a magnetic head and a signal amplitude distribution.

FIG. 2 shows an example of a signal derived from a signal reading head of a magnetic recording apparatus. This signal is used by the head for detecting the magnitude of a change in a magnetic field and for outputting the detected magnitude as a voltage. Generally, recording of signals is performed such that the flux is reversed when data is "1" and the flux is prohibited from being reversed when data is "0". Therefore, during the reading of data, a large change in the magnetic field is detected when data "1" is read. Therefore, the output voltage presents a large peak on the positive side or the negative side when data "1" is read. Also, since the magnetic field is alternately reversed from the N-pole to the S-pole and from the S-pole to the N-pole, the peaks of the output voltage also appear alternately on the positive and negative sides. Read signals may suffer from distortion caused by the frequency characteristics of the electro-magnetic transducer system and multiplexed noise. Further, if data "1" successively appears, a peak shift occurs where the position of each peak is shifted due to interference between the codes, which results in larger distortion. When signals are reproduced, a timing clock for discriminating data must be extracted from such distorted signals to discriminate data "1" and data "0".

Incidentally, a partial response code, which encodes binary data with additional correlation with previous data, may be applied to a magnetic recording apparatus. As a prior art example of a method of discriminating data from partial response codes, a method called the "Viterbi decoding method" has been proposed which does not discriminate each bit of received data but a block of several bits or about fifty bits of data to estimate a train of received data most matching to the coding rule. In this method, a calculation is made for a probability of how closely a received level including distortion and noise corresponds to a logical value. This probability value is called the "branch-metric". By accumulating this branch-metric value, the train having the highest probability of reception is selected from a number of possibly received trains. The branch-metric has been implemented by a logic circuit which corresponds to fixed values of noise distribution and signal levels.

SUMMARY OF THE INVENTION

When the partial response code is applied to a magnetic recording apparatus, two problems are present.

A first problem relates to a method of extracting a discriminating timing clock. Specifically, as shown in FIG. 2, a read waveform presents a three-value waveform which has a zero-cross point coincident with a data discriminating point, and another zero-cross point which is displaced in phase by a half clock from the data discriminating point. For this reason, conventionally employed zero-cross detecting methods have encountered difficulties in only extracting the timing clock which is coincident with the data discriminating point.

It is therefore a first object of the present invention to provide a simple method of extracting a discriminating timing clock from a three-value waveform.

A second problem relates to a correction of non-linearity in the magnetic head characteristics. As shown in FIG. 2, the output voltage derived in accordance with changes in a magnetic field is not symmetric on the positive side ($+1$) and on the negative side ($-1$). Further, this distortion largely varies depending on individual heads. Therefore, the correction of the non-linearity cannot be achieved by a conventional Viterbi decoder based on a fixed branch-metric calculation.

Therefore, it is a second object of the present invention to provided a Viterbi decoding method which is applicable to a signal presenting large non-linearity distortion.

To achieve the first object, a signal processor for discriminating recording data according to the present invention comprises a detector circuit for detecting a zero-cross point of an equalized waveform; a PLL for generating a clock at a rate twice the baud rate of a received signal by using the zero-cross timing as an input; a divider for dividing the output of the PLL into two to generate two baud rate clocks having different phases from each other; and a circuit for selecting one of the two clocks using the waveform of the received signal and for connecting the selected clock to discriminator and decoder circuits. The details of this configuration are described in the foregoing application (U.S. Ser. No. 07/845,196).

To achieve the second object, in a signal processor for discriminating recording data according to the present invention, a branch-metric generator circuit constituting a Viterbi decoder is replaced by a circuit which is externally controlled to provide a variable branch-metric value. Further, a controller is provided for estimating signal distortion from a received signal to appropriately update the branch-metric value.

This controller measures the frequencies of levels of a received signal, regards the three levels presenting the highest frequencies as $+1$, $0$ and $-1$ levels, and assigns the largest branch-metric values to these levels. If the measurement is performed for a long time, the frequencies of the respective levels may be regarded as they are as a noise distribution. Based on this information, a large branch-metric value is set to a level having a high frequency, while a small branch-metric value is set to a level having a low frequency, and the branch-metric value is controlled periodically or upon initial power-up.

The controller, in the present invention, is formed by a received level measuring unit and a comparator circuit for comparing a measured level with a value in a reference table.

A received signal is converted to a word of a several-bit length by an analog-to-digital (hereinafter abbreviated as "A/D") convertor. A counter is provided for each word such that a corresponding counter is incremented by one every time a word or a received level is detected. In this way, the frequencies of respective received levels can be measured. The reference table, on the other hand, performs a function of corresponding a level frequency to the branch-metric. The reference table contains recorded initial values, for example, the frequencies of detected words for the case where a received signal does not present non-linearity distortion, and noise is squarely distributed. The counter value is compared with the corresponding value recorded in the reference table to determine a branch-metric value with which the table is updated.

The foregoing and other objects, advantages, manners of operation and novel features of the present invention will be understood from the following detailed description when read in connection with the accompanying drawings.

DESCRIPTION OF THE PREFERRED EMBODIMENTS

Figure 9:
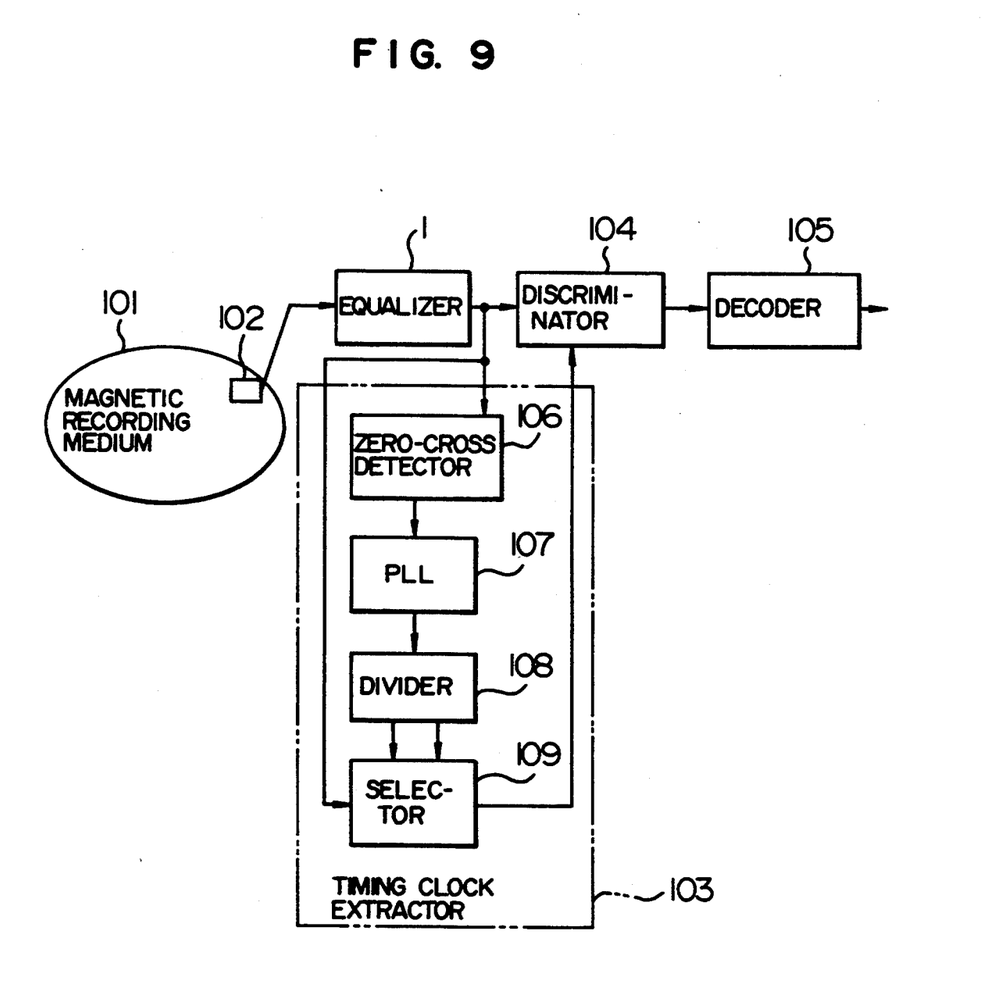
FIG. 9 is a block diagram illustrating an example of the system configuration to which the present invention may be applied.

FIG. 9 illustrates an example of the system configuration according to one embodiment of the present invention. This exemplary configuration comprises a magnetic recording medium 101; a magnetic read head 102; an equalizer 1; a timing clock extractor 103; a discriminator 104; and a decoder 105. A signal recorded on the magnetic recording medium 101 is transduced to an electric signal by the magnetic read head 102 and supplied to the equalizer 1 which in turn corrects waveform distortion of the transduced electric signal. The equalized signal is then subjected to extraction of a discriminating clock in the timing clock extractor 103. The extracted discriminating clock is used by the discriminator 104 for discriminating data from the equalized waveform. The data thus discriminated is decoded by the decoder 105, thus generating binary data from the recorded data. The timing clock extractor 103 comprises a zero-cross detector 106; a phase locked loop (PLL) 107; a divider 108; and a selector 109. The PLL 107 receives the output of the zero-cross detector 106 and outputs a clock at a rate twice the baud rate of the received signal which is synchronous with all zero-cross points. The clock is divided by the divider 108 to generate two clocks at a baud rate which are different in phase from each other. One of the two clocks is a correct clock which has the phase coincident with the discriminating point, while the other one is a clock having the phase shifted by 180°. The selector 109 uses the received signal from the equalizer 1 to select the clock with the phase coincident with the discriminating point. This selection may be carried out in plural ways, the details of which are described in the foregoing known document.

Figure 1:
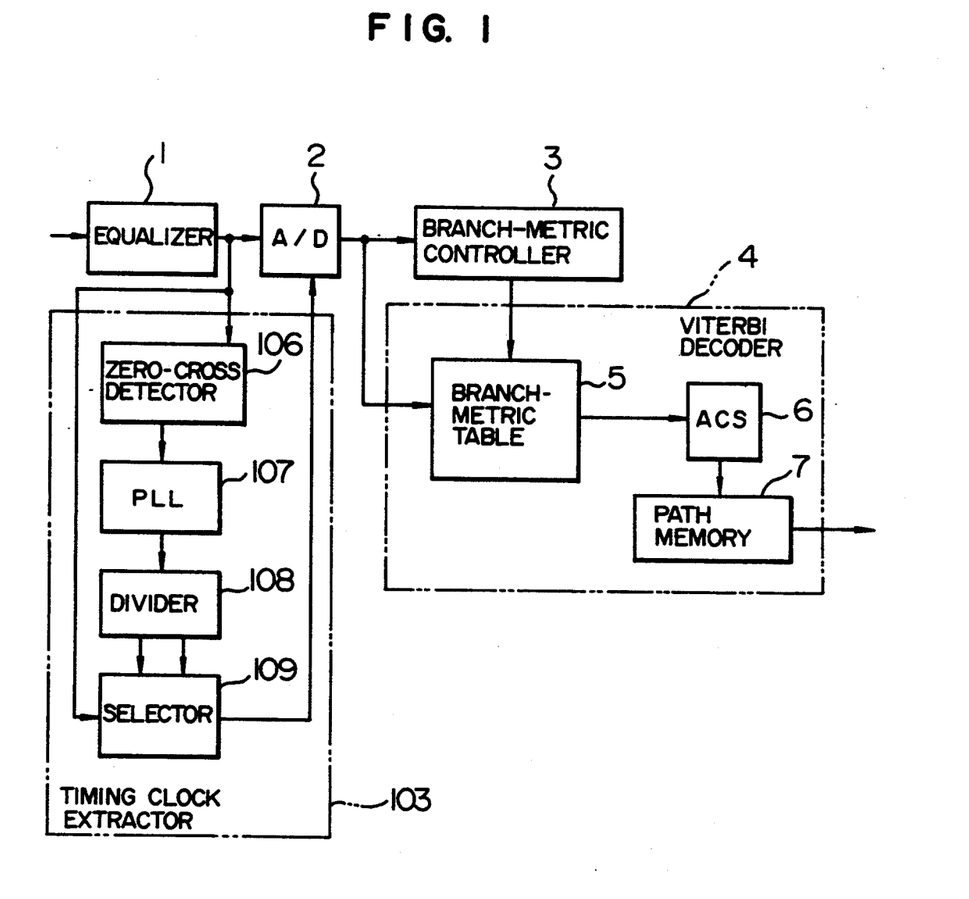
FIG. 1 is a block diagram illustrating a first embodiment of the present invention.

An embodiment of the decoder 105 will next be described in detail. FIG. 1 illustrates a first embodiment of the system, which includes an equalizer 1; an A/D convertor 2; a branch-metric controller 3; a Viterbi decoder 4; and a timing clock extractor 103. In this configuration, the A/D convertor 2 corresponds to the discriminator 104; and the branch-metric controller 3 and the Viterbi decoder 4 to the decoder 105 in FIG. 9, respectively. The Viterbi decoder 4 is formed by a branch-metric table 5; an add.compare.select circuit 6 (hereinafter abbreviated the "ACS"); and a path memory 7. A received signal is subjected to removal of linear inter-code interference by the equalizer 1 and thereafter converted to a digital word of several-bit length by the A/D convertor 2. The branch-metric controller 3 measures the frequency representing how many times each level of a received signal appears. The three levels presenting the largest frequencies are regarded as +1, 0 and −1 and are assigned the largest branch-metric values. It should be noted that if the measurement is performed for a long time, the frequencies of respective levels may be regarded as they are as a noise distribution. Based on the above information, the branch-metric value is set large for a level with a high frequency and small for a level with a low frequency, and the values in the branch-metric table 5 are updated periodically or upon initial power-up. The branch-metric values are accumulated in the ACS 6 such that the train presenting the highest probability of reception is selected from a plurality of possibly received trains from the path memory 7.

Figure 3:
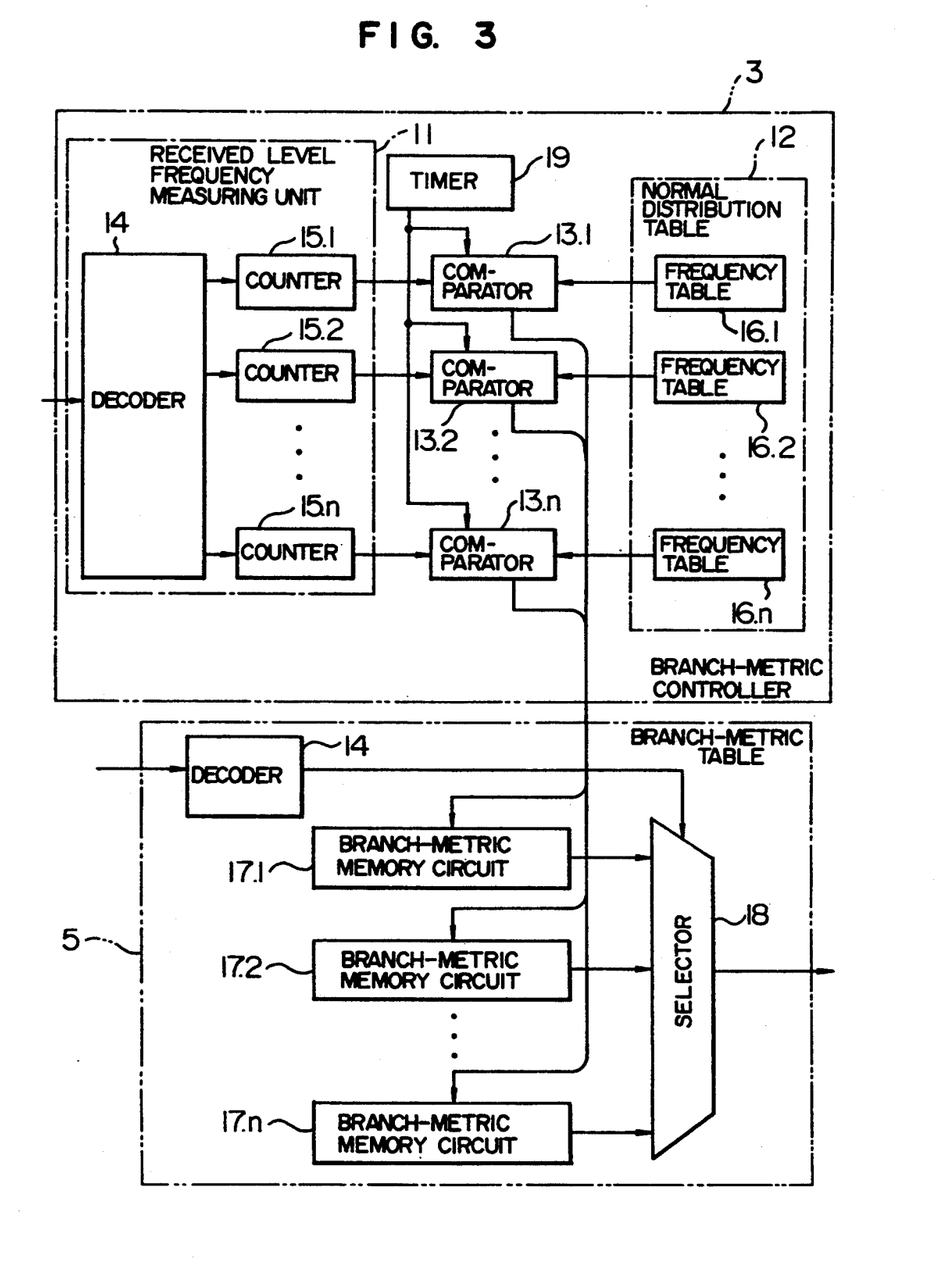
FIG. 3 is a block diagram used for explaining a first implementation of a branch-metric control in the first embodiment.

FIG. 3 illustrates an example of the branch-metric control shown in the embodiment of FIG. 1. The branch-metric controller 3 is formed by a received level distribution measuring unit 11; a normal distribution table 12; and comparators 13.1–13.n. The received level distribution measuring unit 11 is formed by a decoder 14 and counters 15.1–15.n. The normalized distribution table 12 includes frequency tables 16.1–16.n. The branch-metric table 5 is formed by a decoder 14; branch-metric memory circuits 17.1–17.n; and a selector 18.

A received signal converted to a digital word of a several-bit length by the A/D convertor 2 is inputted to the decoder 14 in the branch-metric controller 3, so that a counter 15 corresponding to the word or the level of the received signal is incremented by one. In this way, the frequency of each received level can be measured. The reference table or normal distribution table 12 performs a function of corresponding the level frequency to the branch-metric. The frequency tables 16.1–16.n each have an initial value recorded therein, for example, the frequency of detecting each word in the case where no non-linear distortion is present and noise is squarely distributed. The value in each frequency table is compared with the value in the corresponding counter 15.1–15.n to determine an optimal branch-metric value with which the corresponding branch-metric memory table 17.1–17.n is updated. These memory tables may be implemented by RAMs or by a method of switching several tables formed by random logic circuits.

The received signal is also inputted to the decoder 14 in the branch-metric table 5, which is completely identical to the decoder 14 in the branch-metric controller 3, such that an output of the branch-metric memory table 17 corresponding to a word or a level of the received signal is delivered through the selector 18. This operation allows the most likely decoding to be performed, reflecting the non-linearity of the levels +1, 0 and −1, as shown in FIG. 2, and displacement of the level-dependent noise distribution from the normal distribution.

Figure 4:
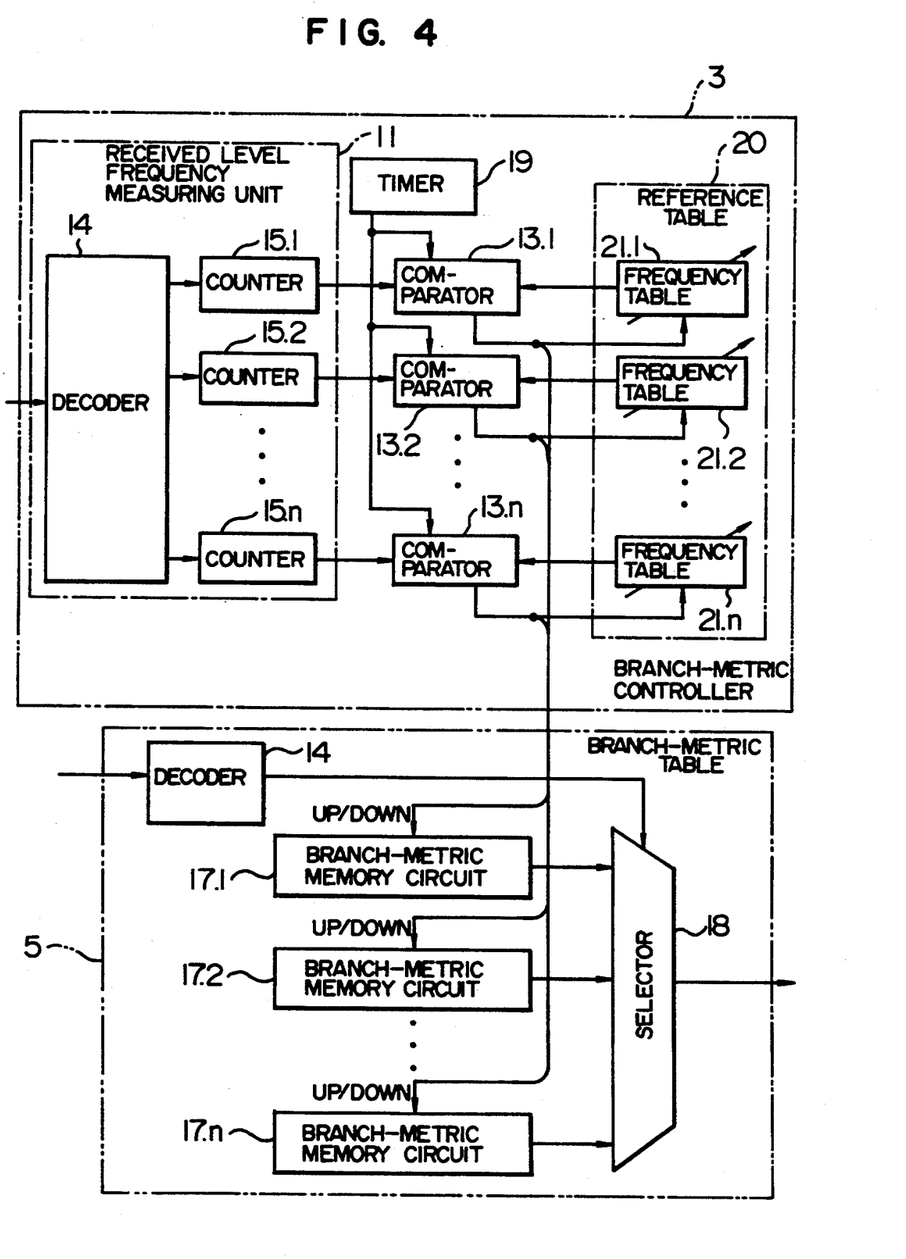
FIG. 4 is a block diagram used for explaining a second implementation of the branch-metric control in the first embodiment.

FIG. 4 illustrates another example of the branch-metric control in the embodiment of FIG. 1. The branch-metric controller 3 is formed by a received level distribution measuring unit 11; a reference distribution table 20; and comparators 13.1–13.n. The received level distribution measuring unit 11 is formed by a decoder 14 and counters 15.1–15.n. The distribution table 20 includes variable frequency tables 20.1–20.n. The branch-metric table 5 in turn is formed by a decoder 14; branch-metric memory circuits 17.1–17.n; and a selector 18.

The branch-metric control of FIG. 4 differs from that of FIG. 3 in that the the reference table 20 of the former does not contain fixed values but updates values recorded therein in accordance with the output of the received level frequency measuring unit 11. Initially, the variable frequency tables 21.1–21.n contain detection frequencies of respective words for the case where noise is squarely distributed. The value contained in each of the variable frequency tables 21.1–21.n is compared with the value in the corresponding counter 15.1–15.n, i.e., the output of the received level frequency measuring unit 11, to determine an optimal branch-metric value. Afterward, the value contained in the corresponding variable frequency table 21.1–21.n is updated together with the value in the branch-metric memory table 17.1–17.n.

The received signal is also inputted to the decoder 14 in the branch-metric table 5 which is completely identical to the decoder 14 in the branch-metric controller 3 such that the output of a branch-metric memory table for a word or a level corresponding to the received signal is delivered through the selector 18. This operation is completely identical to the example of FIG. 3. If a longer measuring time is provided for measuring the level frequencies to improve the control accuracy, a larger capacity is required to the counters 15, which causes an increase in the hardware amount of the circuit. However, if the output of the comparator 13 is utilized to appropriately adjust the contents of the frequency tables 21 as does the present example, a highly accurate control can be achieved even with a relatively small table capacity.

Figure 5:
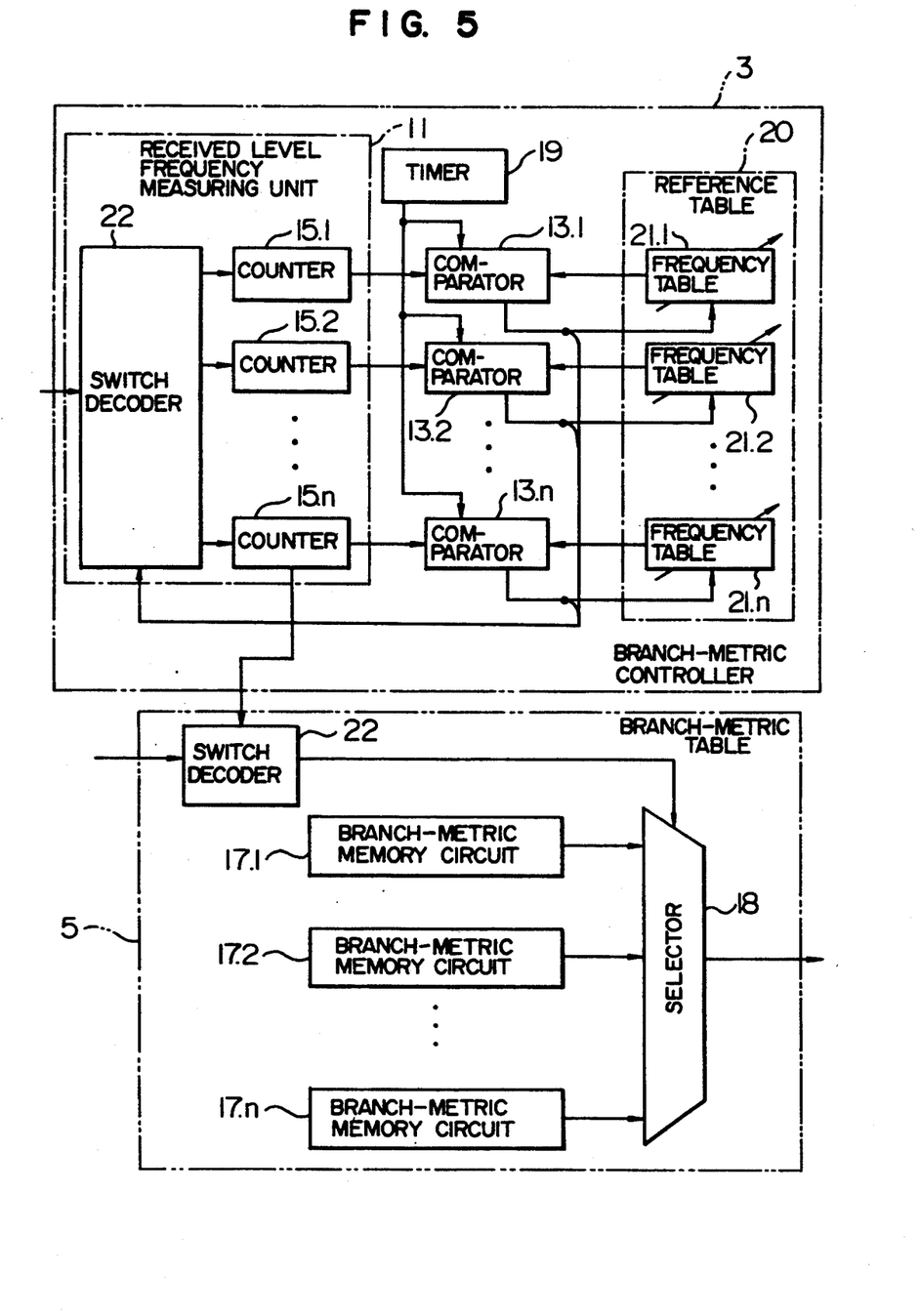
FIG. 5 is a block diagram used for explaining a third implementation of the branch-metric control in the first embodiment.

FIG. 5 illustrates a third example of the branch-metric control in the embodiment shown in FIG. 1. The branch-metric controller 3 is formed by a received level distribution measuring unit 11; a reference distribution table 20; and comparators 13.1–13.n. The received level distribution measuring unit 11 is formed by a switch decoder 22 and counters 15.1–15.n. The reference distribution table 20 includes variable frequency tables 20.1–20.n. The branch-metric table 5, on the other hand, is formed by a switch decoder 22; branch-metric memory circuits 17.1–17.n; and a selector 18.

The difference between the examples of FIG. 4 and 5 lies in that the branch-metric memory circuits 17.1–17.n of FIG. 5 contain fixed values which are varied by changing the correspondence relation between the branch-metric memory circuits 17.1–17.n and a digital word indicative of the amplitude of a received signal.

A received signal converted to a digital word of a several-bit length by the A/D convertor 2 is inputted to the switch decoder 20 in the branch-metric controller 3 so that a counter 15 corresponding to a word or a level of the received signal is incremented by one. The frequency of the received level can be measured in this way. The variable frequency tables 21.1–21.n contain the detection frequencies of respective words when noise is squarely distributed. Each value in the variable frequency tables 21.1–21.n is compared with the value in the corresponding counter 15.1–15.n by the comparator 13.1–13.n to determine an optimal branch-metric value. Afterward, the value in the corresponding branch-metric memory table 17.1–17.n is updated using the thus determined branch-metric value together with the value in the variable frequency table.

Further, the received signal is inputted to the switch decoder 20 in the branch-metric table 5 which is completely identical to the switch decoder 20 in the branch-metric controller 3, so that the output of a branch-metric memory table 17 for a word or a level corresponding to the received signal is delivered through the selector 18. In this example, the contents of the branch-metric memory circuit 17 are not changed but the correspondence of the amplitude of a received signal to the branch-metric alone is changed by switching, thereby making it possible to realize this operation with a relatively simple circuit.

Figure 6:
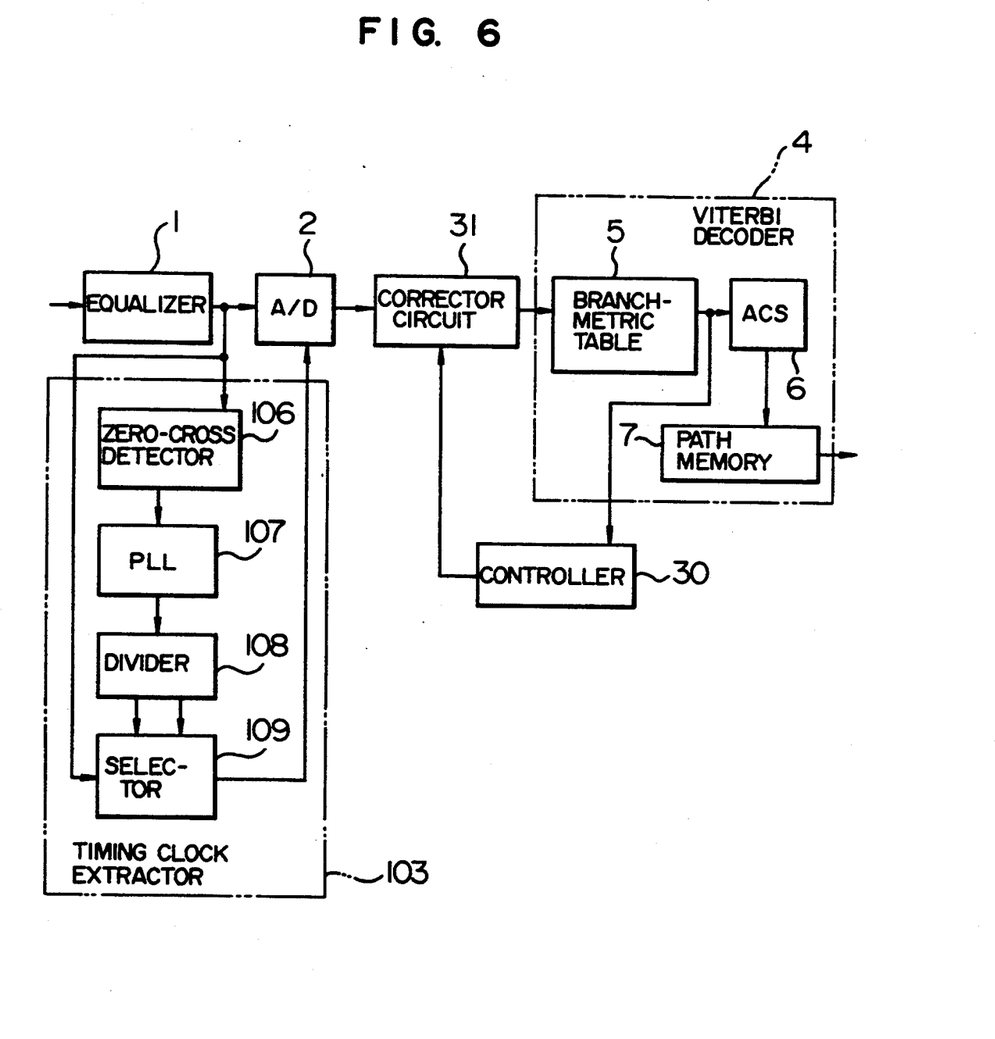
FIG. 6 is a block diagram illustrating a second embodiment of the present invention.

FIG. 6 illustrates a second embodiment of the system. The system according to this embodiment comprises an equalizer 1; an A/D convertor 2; a corrector circuit 40; a branch-metric controller 3; a Viterbi decoder 4; and a timing clock extractor 103. The Viterbi decoder 4 is formed by a branch-metric table 5; an ACS 6; and a path memory 7. The second embodiment differs from the embodiment shown in FIG. 1 in that the branch-metric control is performed in a feedback loop using the output of the branch-metric table 5. The branch-metric controller 3 utilizes the output of the branch-metric table 5 to detect non-linear errors corresponding to the respective levels +1, 0 and −1, and a correction is made in the corrector circuit 40 based on the non-linear errors. The feed-back configuration allows a correction with less errors to be performed with a smaller control amount.

Figure 7:
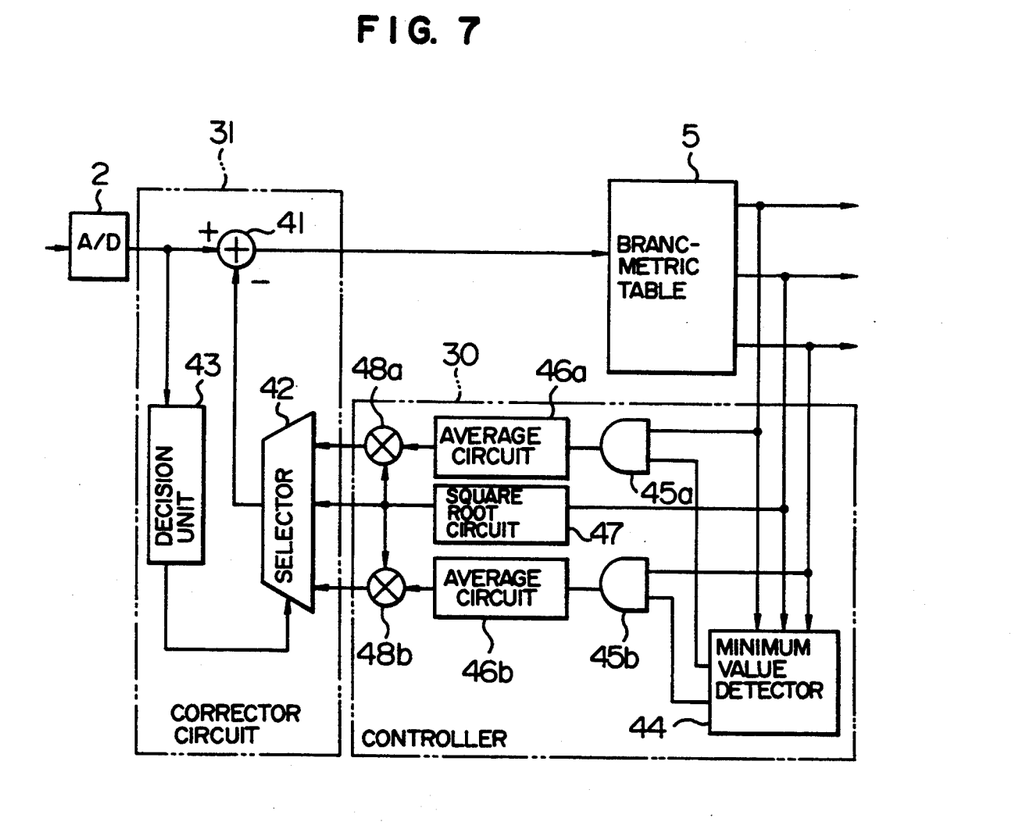
FIG. 7 is a block diagram used for explaining an implementation of a control performed in the second embodiment.

FIG. 7 illustrates examples of the branch-metric controller 3 and the corrector circuit 40 shown in the embodiment of FIG. 6. A corrector 31 is formed formed by an adder 41; a selector 42; and a decision unit 43. A controller 30 is formed by a minimum value detector circuit 44; mask circuits 45a and 45b; average circuits 46a and 46b; a square root output circuit 47; and multipliers 48a and 48b.

Outputted from the branch-metric table 5 are squares of errors between the level of a received signal and the levels +1, 0 and −1, respectively, as branch-metric. The minimum value detector circuit 44 compares the three error values, regards the smallest one as an equalized error, and opens the corresponding gate circuit 45a or 45b. In this way, the average circuit 46a is supplied only with an equalized square of the error between the received level and the level +1, and the average circuit 46b only with an equalized square of the error between the received level and the level −1. Therefore, the average circuits 46a, 46b integrate the respective supplied equalized square errors to derive average square errors relative to the levels +1 and −1, respectively. The square root calculating circuit 47 calculates the square roots of all square errors corresponding to the levels +1, 0 and −1, and thereafter averages the calculated square roots to derive a correction value for the 0 level. This correction value is multiplied with the square errors corresponding to the levels +1 and −1 to derive correction values for the levels +1 and −1. The selector 42 selects either of the correction values for the levels +1, 0 and −1 in accordance with a decision made by the decision unit 43. The correction value thus selected is subtracted from the received level by the adder 41 to correct the nonlinearity error included in the received signal.

Figure 8:
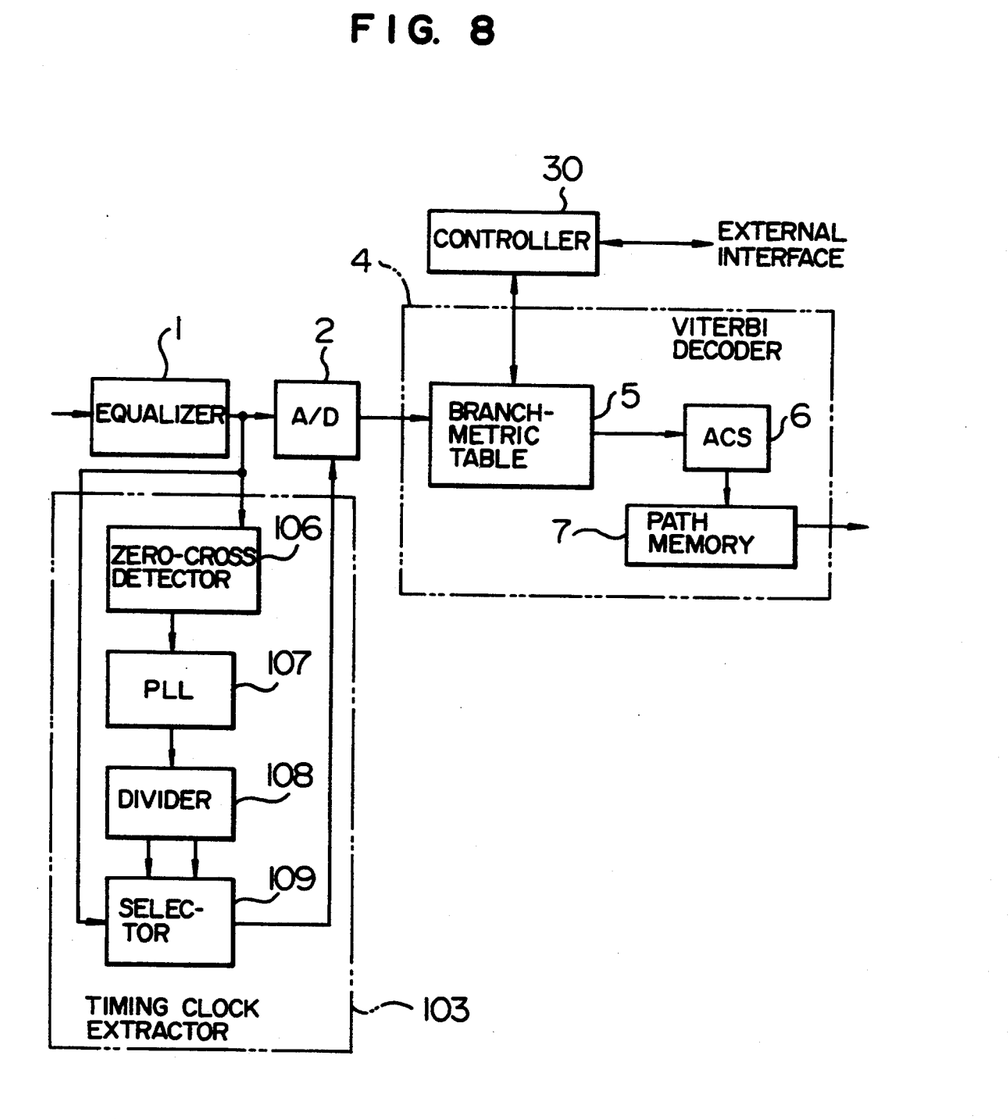
FIG. 8 is a block diagram illustrating a third embodiment of the present invention.

FIG. 8 illustrates a third embodiment of the system. The system of the present embodiment comprises an equalizer 1; an A/D convertor 2; a controller 30; a Viterbi decoder 4; and a timing clock extractor 103. The Viterbi decoder 4 is formed by a branch-metric table 5; an ACS 6; and a path memory 7. The decoder 105 of the present embodiment differs from that shown in FIG. 1 in that the controller 30 can perform both the previously described feed-forward control and a feed-back control by reading or writing intermediate calculation results from or into the branch-metric table 5. The controller 30 is suitably implemented by a microcomputer. In this case, since the input/output speed of the microcomputer in general is not so high, it is required that high speed RAM is provided in the branch-metric table 5 such that data read from a disk medium is once stored in the RAM and then transferred to the microcomputer-based controller 30 with a low speed clock. Simultaneously, the branch-metric table 5 outputs a preliminary metric to the ACS 6 until the control of the controller 30 becomes valid. Calculations necessary for correcting non-linearity errors may be all performed in the microcomputer or by a separate computer unit connected through an external interface. This technique is particularly effective when the measurement of the frequencies of received signal levels and the calculation of optimal branch-metric values have been performed upon adjustment before shipment or upon powering up the apparatus so as to limitatively perform fine adaptive operations and switching of the branch-metric among a plurality of prepared values during the normal operation.

As described above, according to the present invention, magnetically recorded information read by a magnetic head having non-linearity characteristics can be reproduced at a low error rate, which results in remarkably improving the reliability of magnetic recording apparatus.

I claim:

1. A signal processor for discriminating recording data comprising:
   a magnetic recording medium;
   a magnetic head for reading a signal from said medium;
   an equalizer for processing said read signal;
   a detector circuit for detecting zero-cross points of the equalized waveform of said read signal;
   a phase locked loop means (PLL) utilizing said zero-cross timing as an input for generating a clock signal at a rate twice the baud rate of said read signal;
   a frequency divider for dividing an output frequency of said PLL means by two to generate two baud rate clock signals having different phases from each other; and
   a circuit for selecting one of said clock signals by using the waveform of the received signal and for connecting said selected clock signal to discriminator and decoder circuits,
   wherein said discriminator circuit discriminates digital data from the equalized waveform of said read signal utilizing said selected clock signal as a discriminating clock signal.

2. A signal processor for discriminating recording data according to claim 1, wherein said decoder circuit includes:
   a Viterbi decoder having a branch-metric table having a plurality of branch-metric memory circuits, each of which corresponds to a certain received signal level, a selector which selects one of said branch-metric memory circuits to provide an output of said branch-metric memory circuits, and a decoder which decodes a received signal and generates a selector control signal; and
   a branch-metric controller connected to said branch metric table having a plurality of counters which measure frequencies of received signal levels, reference tables which store typical frequency data of frequencies of the received signal levels, and comparators which compare outputs of said counters with outputs of said reference tables to provide updated typical frequency data that is stored in said branch-metric memory circuits;
   wherein said Viterbi decoder further includes: an add-compare-select circuit which processes the outputs of said branch-metric table and selects a most likely sequence; and a path memory which memorizes survivor paths and outputs the most likely sequence which is selected by said add-compare-select circuit.

3. A signal processor for discriminating recording data according to claim 1, wherein said decoder circuit includes:
   a Viterbi decoder having a branch-metric table having a plurality of branch-metric memory circuits, each of which corresponds to a certain received signal level, a selector which selects one of said branch-metric memory circuits to provide an output of said branch-metric memory circuits, and a decoder which decodes a received signal and generates a selector control signal; and
   a branch-metric controller connected to said branch metric table which acquires updated data of frequencies of the received signal levels from an external interface and writes said updated data into said branch-metric memory circuits;
   wherein said Viterbi decoder further includes an add-compare-select circuit which processes the outputs of the branch-metric table and selects a most likely sequence; and a path memory which memorizes survivor paths and outputs the most likely sequence which is selected by said add-compare-select circuit.

4. A signal processor for discriminating recording data according to claim 1, wherein said decoder circuit includes:

a Viterbi decoder having a branch-metric table having a plurality of branch-metric memory circuits, each of which corresponds to a certain received signal level, a selector which selects one of said branch-metric memory circuits to provide an output of said branch-metric memory circuits, and a decoder which decodes a received signal and generates a selector control signal;

a controller connected to said branch metric table which calculates an error signal from the outputs of said branch metric table; and a corrector circuit which subtracts said error signal from a received signal and outputs a result of subtraction to said branch-metric table;

wherein said Viterbi decoder further includes an add-compare-select circuit which processes the outputs of said branch-metric table and selects a most likely sequence; and a path memory which memorizes survivor paths and outputs the most likely sequence which is selected by said add-compare-select circuit.

* * * * *